United States Patent [19]
Käser

[11] Patent Number: 5,674,299
[45] Date of Patent: Oct. 7, 1997

[54] PROCESS FOR DYEING PAPER

[75] Inventor: Adolf Käser, Bottmingen, Switzerland

[73] Assignee: Ciba-Geigy Corporation, Tarrytown, N.Y.

[21] Appl. No.: 500,654

[22] Filed: Jul. 12, 1995

[30] Foreign Application Priority Data

Jul. 15, 1994 [CH] Switzerland .................. 2269/94

[51] Int. Cl.⁶ .................. D06P 1/41; D06P 3/58; C09B 44/00
[52] U.S. Cl. .................. 8/655; 8/654; 8/687; 8/688; 8/919
[58] Field of Search .................. 534/603–613, 534/819, 788, 787, 850, 792, 772, 150; 8/919, 654, 657, 662, 655, 687, 688

[56] References Cited

U.S. PATENT DOCUMENTS

| | | | |
|---|---|---|---|
| 3,890,257 | 6/1975 | James | 260/148 |
| 3,987,022 | 10/1976 | James | 260/146 R |
| 3,996,282 | 12/1976 | Jefferies et al. | 260/567.6 M |
| 4,103,092 | 7/1978 | Jefferies et al. | 260/175 |
| 4,211,697 | 7/1980 | Desai | 260/158 |
| 4,213,897 | 7/1980 | Moser et al. | 260/154 |
| 4,940,783 | 7/1990 | Stingelin | 534/605 |

FOREIGN PATENT DOCUMENTS

| | | |
|---|---|---|
| 0306452 | 3/1989 | European Pat. Off. . |
| 1903058 | 10/1969 | Germany . |
| 1965994 | 1/1971 | Germany . |
| 1262301 | 2/1972 | United Kingdom . |
| 1299080 | 12/1972 | United Kingdom . |
| 2133030 | 7/1984 | United Kingdom . |

*Primary Examiner*—Margaret Einsmann
*Attorney, Agent, or Firm*—Kevin T. Mansfield; George R. Dohmann

[57] ABSTRACT

The cationic or basic dyes of formulae (1) and (2) cited in claim 1 are particularly suitable for dyeing paper.

These dyes dye paper in a yellow, orange or brown shade having good fastness properties.

16 Claims, No Drawings

PROCESS FOR DYEING PAPER

The present invention relates to a process for dyeing paper as well as to novel cationic or basic azo dyes used in said process and which are free of sulfonic acid groups.

It is the object of this invention to provide a process for dyeing paper, which process comprises treating the paper with a dye of formula

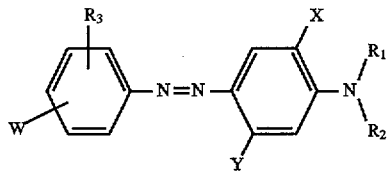

(1)

or

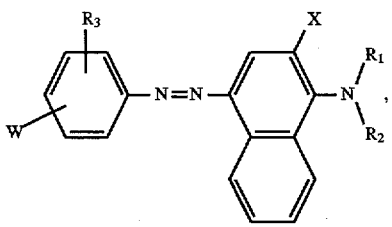

(2)

wherein

X and Y are each independently of the other hydrogen, halogen, $C_1$–$C_4$alkyl, $C_1$–$C_4$alkoxy, $C_1$–$C_4$alkylcarbonylamino, arylcarbonylamino, ureido or arylureido, $R_1$ is hydrogen, unsubstituted or substituted alkyl or aryl, or has the meaning of $R_2$, $R_2$ is a cationic or protonisable radical, or wherein $R_1$ and $R_2$, together with the linking N atom, form an unsubstituted or substituted 5-, 6-, or 7-membered ring which may contain further hetero atoms, $R_3$ is hydrogen, halogen, $C_1$–$C_4$alkyl or $C_1$–$C_4$alkoxy, W is a radical of formula

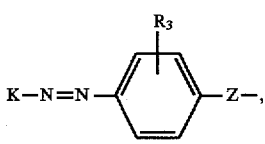

(3)

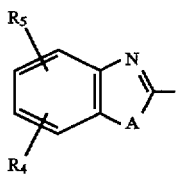

(4)

or

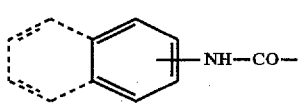

(5)

wherein

K is a coupling component,

Z is a linking group,

A is O, S or NH, and $R_4$ and $R_5$ are each independently of the other hydrogen, halogen, $C_1$–$C_4$alkyl or $C_1$–$C_4$-alkoxy.

Alkyl radicals in this specification will be quite generally understood as meaning straight-chain, branched or cyclic alkyl groups. Cycloalkyl preferably contains 5 to 8 carbon atoms, and open-chain alkyl preferably contains 1 to 8, most preferably 1 to 4, carbon atoms.

Unbranched or branched open-chain alkyl will typically be: methyl, ethyl, n- and isopropyl, n-, sec- or tert-butyl, n- and isopentyl, n- and isohexyl or 2-ethylhexyl.

These alkyl radicals may carry one or more than one substituent, e.g., those selected from the group consisting of hydroxy, carboxy, halogen, cyano, $C_1$–$C_4$alkoxy, hydroxy-substituted $C_1$–$C_4$alkoxy, amino, alkylamino, dialkylamino, aminocarbonyl, phenyl, phenoxy and phenylaminocarbonyl, in which three last mentioned radicals the phenyl group may in turn be substituted by $C_1$–$C_4$alkoxy, $C_1$–$C_4$alkoxy or phenoxy.

Illustrative examples of suitable radicals of this kind are: hydroxyethyl, 2-hydroxyprop-1-yl, 1-hydroxyisopropyl, 2-hydroxyisopropyl, 2,3-dihydroxyprop-1-yl, methoxyethyl, ethoxymethyl, methoxycarbonyloxyethyl, chloroethyl, cyanoethyl, benzyl, 1-phenylethyl, 2-phenylethyl, dimethylaminoethyl, diethylaminoethyl, hydroxyethylaminoethyl, dihydroxyethylaminoethyl, methoxycarbonylethyl or aminocarbonylethyl.

Cycloalkyl is in particular cyclopentyl and cyclohexyl; and the suitable substituent is in particular $C_1$–$C_4$alkyl, especially $CH_3$.

Suitable alkoxy radicals are preferably those containing 1 to 4 carbon atoms, typically methoxy, ethoxy, propoxy, isopropoxy, n-butoxy, isobutoxy or tert-butoxy. These alkoxy radicals may be substituted, conveniently by the radicals cited as substituents of the alkyl groups, preferably by hydroxy or $C_1$–$C_4$alkoxy. Illustrative examples of substituted alkoxy radicals are hydroxyethoxy, methoxyethoxy, 2-hydroxypropoxy, 1,2-dihydroxyprop-3-oxy or 1,2-dimethoxyprop-3-oxy.

Halogen will typically be taken to mean fluoro, bromo, iodo or, preferably, chloro.

Aryl radicals will be understood as meaning in this specification quite generally aromatic or heteroaromatic radicals, but preferably naphthyl or, most preferably, phenyl radicals. All these radicals may be unsubstituted or substituted. Suitable substituents are typically $C_1$–$C_4$alkyl, $C_1$–$C_4$alkoxy, bromo, chloro, nitro, cyano, carboxy or $C_1$–$C_4$alkylcarbonylamino. The particularly preferred meaning of aryl is, however, phenyl.

X in the dyes of formulae (1) and (2) is preferably hydrogen, methyl, methoxy and chloro, and Y is preferably hydrogen, methyl, methoxy, acetylamino and chloro.

Particularly suitable radicals $R_1$ are $C_1$–$C_4$alkyl radicals and $C_1$–$C_4$alkyl radicals which are substituted by chloro, cyano, phenyl, methoxycarbonyl, methoxycarbonyloxy, mono- or di-$C_1$–$C_4$alkylamino, the alkyl moieties of which mono- or di-$C_1$–$C_4$alkylamino groups may in turn be substituted by hydroxy, amino or mono- or di-$C_1$–$C_4$alkylamino. Further preferred radicals $R_1$ may have the meanings cited hereinafter for $R_2$.

If $R_1$ and $R_2$, together with the linking N atom, form a 5-, 6- or 7-membered ring, then said ring is preferably a pyrrolidine, piperidine, morpholine or piperazine ring. The piperazine radical can be substituted at the N atom not attached to the coupling component, typically by alkyl, arylcarbonyl or arylaminocarbonyl.

The cationic or protonisable radical $R_2$ is typically an amine radical or a quaternised ammonium radical which is linked to the N atom through a linking group. Said radical is preferably a radical of formula

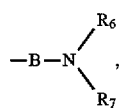 (6)

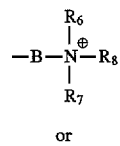 (7)

or

 (8)

wherein B is an unbranched or branched alkylene radical, $R_6$ is hydrogen or unsubstituted or substituted alkyl, $R_7$ and $R_8$ are each independently of the other unsubstituted or substituted alkyl, and $Q^\oplus$ is a cyclic cationic radical, or wherein $R_6$ and $R_7$, together with the linking N atom, form an unsubstituted or substituted 5-, 6-, or 7-membered ring which may carry futher hetero atoms, or wherein $R_6$, $R_7$ and $R_8$, taken together, form a pyridinium ring.

If $R_6$ and $R_7$, together with the linking N atom, form a 5-, 6- or 7-membered ring, then said ring is preferably a pyrrolidine, piperidine, morpholine or piperazine ring. The piperazine radical may be substituted at the N atom not attached to B, typically by alkyl, arylcarbonyl, arylaminocarbonyl or, preferably, by an aromatic carbocyclic or heterocyclic radical.

Suitable radicals B are preferably $C_2$-$C_8$ alkylene radicals, in which the alkylene chain may be straight-chain or branched or also interrupted by linking groups such as —NH—CO—, —NH—, —O—$C_6H_4$—, —O—CO—$C_6H_4$—or —O—CO—, or in which the alkylene chain is linked to the radical $Q^\oplus$ through one of these linking groups.

Particularly suitable radicals B are ethylene, n-propylene, isopropylene or n-butylene. Among these, ethylene is particularly preferred.

Unsubstituted or substituted alkyl radicals suitable for $R_6$, $R_7$ and $R_8$ are preferably $C_1$-$C_4$alkyl radicals which are unsubstituted or substituted by hydroxy, amino, mono-$C_1$-$C_4$alkylamino, di-$C_1$-$C_4$alkylamino or phenyl.

Suitable radicals $Q^\oplus$ are typically N-$C_1$-$C_4$alkylpipefidinium, N-$C_1$-$C_4$alkyl-morpholinium, N-$C_1$-$C_4$alkylpyrrolidinium or N-$C_1$-$C_4$alkylpiperazinium, N-$C_1$-$C_4$alkyl-3-pyridinium or N-$C_1$-$C_4$alkyl-4-pyridinium.

The preferred meanings of $R_3$ are chloro, methyl or methoxy; but hydrogen is preferred.

If W is a radical of formula (3), then $R_3$ is likewise preferably chloro, methyl or methoxy; but hydrogen is preferred.

Z is a linking group, typically -$NR_9$—CO—, —CO—$NR_9$—$NR_9$—CO—,

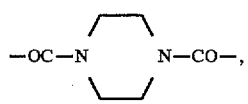

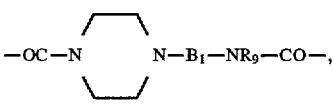

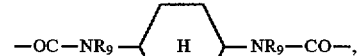

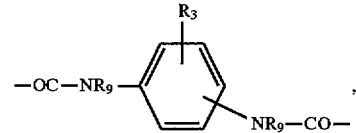

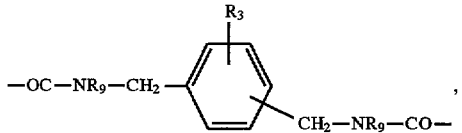

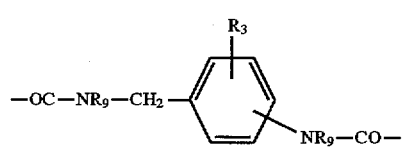

or —CO—$NR_9$—$B_1$—$NR_9$—CO—, wherein $R_9$ is hydrogen or unsubstituted or substituted $C_1$-$C_4$alkyl, $B_1$ is a $C_2$-$C_{12}$alkylene radical, in which the alkylene chain may be straight-chain or branched and may be interrupted by one or more than one member, preferably by one or two members, selected from —$NR_9$—, —O—and —S—, and $R_3$ is hydrogen, halogen, $C_1$-$C_4$alkyl or $C_1$-$C_4$alkoxy.

$R_9$ is preferably methyl and, most preferably, hydrogen, and $R_3$ is preferably hydrogen.

$B_1$ is preferably unsubstituted or hydroxy-substituted $C_2$-$C_4$alkylene, ($C_2$-$C_6$alkylene)-O-($C_2$-$C_6$alkylene), ($C_2$-$C_6$alkylene)-O-($C_2$-$C_6$alkylene)-O-($C_2$-$C_6$alkylene) or ($C_2$-$C_6$alkylene)-$NR_9$-($C_2$-$C_6$alkylene).

Among the cited linking groups Z the following are particularly preferred: —NH—CO—, —CO—NH—NH—CO—,

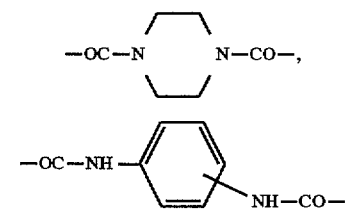

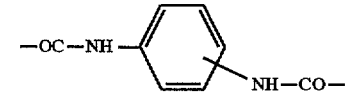

and —CO—NH—($C_2$-$C_4$alkylene)—NH—CO—.

In formula (3) K is a coupling component, preferably a coupling component known in the chemistry of azo dyes for dyeing paper.

Preferred coupling components are:

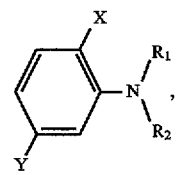

-continued

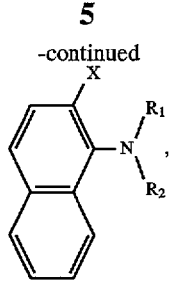,

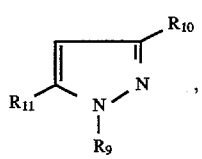,

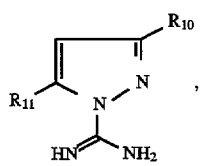,

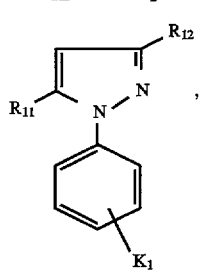,

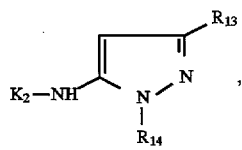,

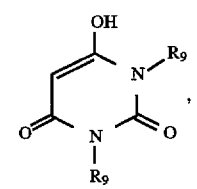,

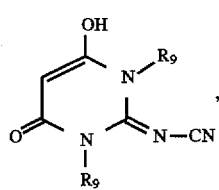,

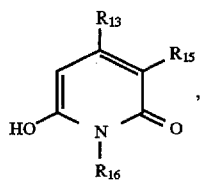,

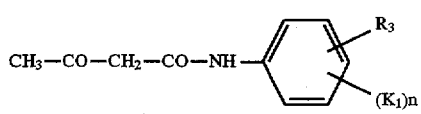

or

-continued

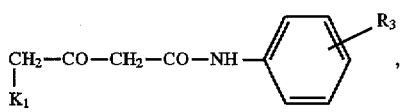, wherein X, Y, $R_1$ and $R_2$ have the meanings given for formulae (1) and (2), $R_{11}$ is $C_1$–$C_4$alkyl, carboxy or $K_2$, $R_9$ is hydroxy or amino, $R_9$ is hydrogen or unsubstituted or substituted $C_1$–$C_4$alkyl, $R_{12}$ is $C_1$–$C_4$alkyl or $K_2$, $R_{13}$ is $C_1$–$C_4$alkyl, $R_{14}$ is hydrogen, unsubstituted or substituted $C_1$–$C_4$alkyl or unsubstituted or substituted phenyl, $R_{15}$ is hydrogen, chloro, cyano or carbamoyl, $R_{16}$ is hydrogen, unsubstituted or substituted $C_1$–$C_4$alkyl or $K_3$, n is 1 or 2, $K_1$ is

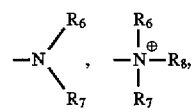

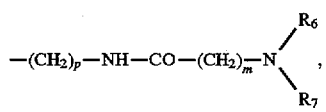,

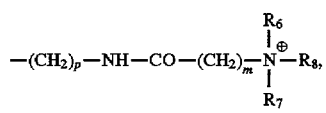,

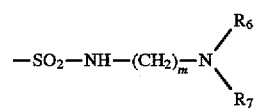

or

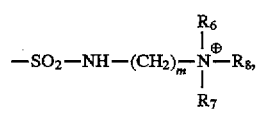, $K_2$ is 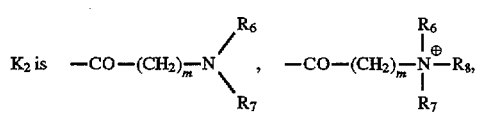

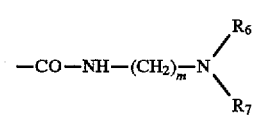

or

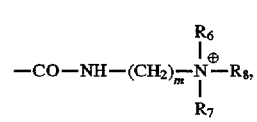, $K_3$ is 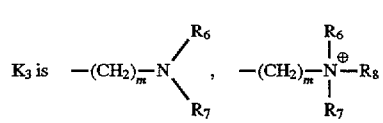

or

-continued

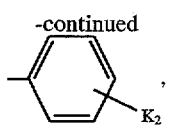

and m is 1 to 4, and $R_6$, $R_7$ and $R_8$ have the meanings given for formulae (6) and (7).

Among these coupling components those of formula

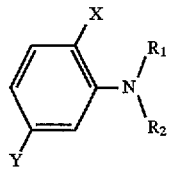

are particularly preferred.

If W is a radical of formula (4), then $R_4$ and $R_5$ are preferably each independently of the other hydrogen, chloro, methyl or methoxy and, more particularly, $R_4$ is hydrogen and $R_5$ is hydrogen, chloro, methyl or methoxy.

It will be readily understood that those inventive dyes containing cationic groups contain equivalent mounts of anions.

The anion $An^\ominus$ is suitably an inorganic as well as an organic anion, typically including: halide, e.g. chloride, bromide or iodide, sulfate, methyl sulfate, boron tetrafluoride, aminosulfonate, perchlorate, carbonate, bicarbonate, phosphate, phosphoromolybdate, phosphorotungstate, phosphorotungstomolybdate, benzenesulfonate, naphthalenesulfonate, 4-chlorobenzenesulfonate, oxalate, maleate, acetate, propionate, lactate, succinate, chloroacetate, tartrate, methanesulfonate or benzoate ions, or a complex anion, such as the anion of zinc chloride double salts.

The anion will usually be determined by the process for the preparation of the dyes. The dyes preferably contain the anion as chloride, hydrogensulfate, sulfate, methosulfate, phosphate, formate, lactate or acetate. The anion can be exchanged in known manner for another anion.

If the dyes of this invention carry further cationic groups, then they contain as additional anions preferably those listed above.

A particularly preferred embodiment of the process of this invention comprises using a dye of formula wherein
X and Y are each independently of the other hydrogen, halogen, $C_1-C_4$alkyl, $C_1-C_4$alkoxy, $C_1-C_4$alkylcarbonylamino, arylcarbonylamino, ureido or arylureido, $R_1$ is hydrogen, unsubstituted or substituted alkyl or aryl, or has the meaning of $R_2$, and $R_2$ is a cationic or protonisable radical.

The dyes of formulae (9) and (10) are typically obtained by diazotising 4,4'-diaminobenzanilide and coupling the diazo compound so obtained with a coupling component of formula

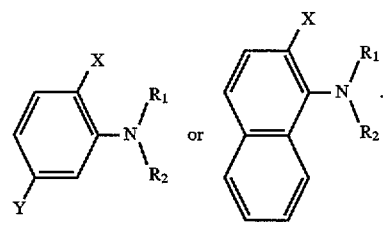

The diazotisation is carried out in known manner, typically with sodium nitrite in acid, aqueous medium, e.g. a medium containing sulfuric acid.

The coupling of the diazotised 4,4'-diaminobenzanilide to the coupling component of the above formulae is likewise carried out in known manner, typically in acid, aqueous or aqueous-organic medium, preferably in the temperature range from $-10°$ to $40°$ C., most preferably in the range below $10°$ C. The acids used are typically hydrochloric acid, acetic acid, sulfuric acid or phosphoric acid. Diazotisation and coupling can be carried out in a one-pot process, i.e. in the same reaction medium.

The remaining dyes used according to the practice of the invention are known or can be prepared in per se known manner. Surprisingly, these dyes are particularly suitable for dyeing paper, and the dyeings so obtained are distinguished in particular by good fastness to light.

The dyes may be used in accordance with all customary processes for substantive dyes in the paper industry, in particular for beater dyeing as well as for surface dyeing of sized and unsized paper types based on bleached and unbleached cellulose of different origin, such as softwood or hardwood sulfite and/or softwood or hardwood sulfate cellulose. They are also suitable for dyeing wood pulp paper.

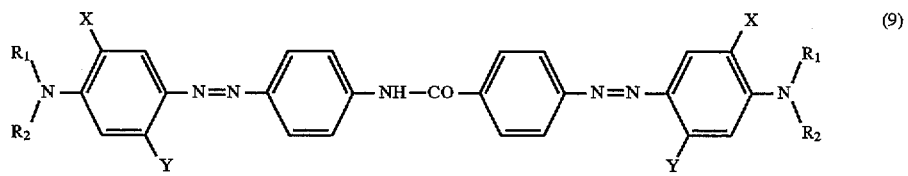
(9)

or

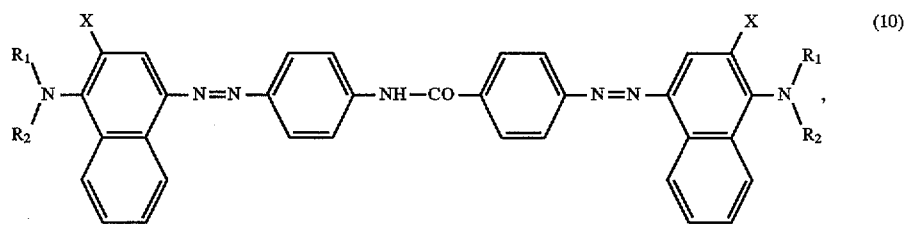
(10)

The dyes of formulae (9) and (10) according to this invention are particularly suitable for dyeing paper, as they have a high substantivity for this substrate. There are obtained dyeings in yellow to brown and, in particular, orange, shades which have good fastness properties. Dyes carrying cationic charges, moreover, are especially suitable for dyeing wood containing paper (wood pulp). The wastewater, in most cases, is completely colourless.

The dyes of formulae (1) and (2) can be formulated to solid or liquid physical forms and used for dyeing paper.

In powder or granular form the dyes are used preferably for batchwise beater dyeing, in which the dye is added batchwise to the pulper, hollander or mixing chest. The dyes are preferably added as formulations which may contain extenders, e.g. urea as solubiliser, dextrins, Glauber's salt, sodium chloride, as well as dispersants, dust inhibitors and chelating agents such as tetrasodium pyrophosphate.

The invention accordingly also relates to solid dye formulations for dyeing paper, which formulations contain dyes of formulae (1) or (2).

In recent years the use of concentrated aqueous solutions of dyes has gained importance on account of the advantages which such solutions have over dyes in powder form. The use of solutions avoids the problems associated with dust formation, and the dyer is relieved of the time-consuming and often difficult operation of dissolving the dye powder in water. The use of dye solutions has, moreover, been promoted by the development of continuous processes for dyeing paper, as in such processes it is expedient to add the solution direct to the hollander or at any other suitable juncture in paper manufacture.

Hence the invention further relates to concentrated aqueous solutions of dyes of formula (1) or (2), which solutions contain no less than 5% per weight, typically 8 to 30% by weight of dye, based on the total weight of the solution.

Concentrated aqueous solutions of dyes of formula (1) or (2) can be prepared by filtering the dye suspension obtained in the synthesis of the dye, if appropriate effecting deionisation, conveniently by a membrane separation method, and stabilising the solution by the addition of auxiliaries such as urea, ε-caprolactam or polyethylene glycol. It is, however, also possible to suspend the isolated dye in hydrochloric acid, to filter the dye suspension once more and to mix the filter cake with lithium hydroxide or a suitable amine, typically an alkanolamine, and the requisite amount of water. Finally, it is also possible to carry out the coupling in the presence of lithium hydroxide, ammonia or alkanolamine, and to deionise the synthesis solution. Such dye solutions are suitable for dyeing paper pulp in the presence of rosin and alum size.

The dye solutions so obtained preferably contain, per 100 parts of dye, 400 to 900 parts of water, 0 to 200 parts of further auxiliaries such as urea, ε-caprolactam or polyethylene glycol as well as 0 to 400 parts of an organic carboxylic acid, e.g. formic acid, acetic acid, propionic acid or lactic acid.

The novel aqueous concentrates, which are stable at storage temperatures of up to −5° C., are suitable for dyeing paper on which, with or without the use of a size, they give attractive yellow, orange or brown shades.

The dyes of formulae (1) and (2) can also be used for dyeing textile materials made of cellulose, e.g. cotton, as well as for dyeing leather and glass fibres.

In the following illustrative Examples parts and percentages are by weight.

EXAMPLE 1

22.7 parts of 4,4'-diaminobenzanilide are tetrazotised in known manner in 500 parts of water and 50 parts of 32% hydrochloric acid with sodium nitrite in the temperature range from 0° to 5° C. Then 34.4 parts of N-ethyl-N-(N'-dimethyl-N'-hydroxy-ethylammonium)ethyl-1,3-toluidine chloride and 5 parts of sodium acetate are added. The pH is adjusted, with vigorous stirring, to 4.0 with 2N sodium hydroxide solution. Coupling is carried out at pH 4 to 4.5 by further addition of sodium hydroxide solution. At the same time the temperature is raised over 2 hours from 0° to 5° C. to 30° C. The partially precipitated dye is completely precipitated by the addition of 20 parts of sodium chloride and the precipitate is then collected by suction filtration and dried, to give 85 parts of the dye of formula

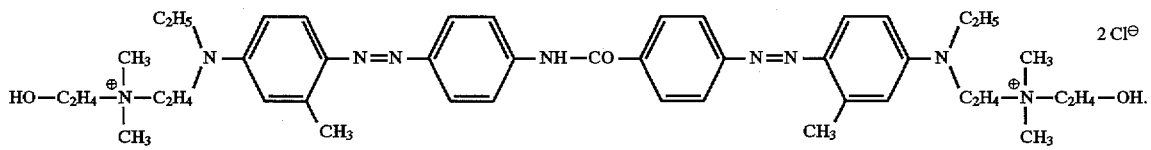

The dye dyes paper in a brilliant orange shade of excellent fastness to wet treatments and light. The waste-waters are colourless.

EXAMPLES 2–74

The following dyes are prepared in general accordance with the procedure described in Example 1. They dye paper in yellowish to reddish orange or brown shades having good fastness properties.

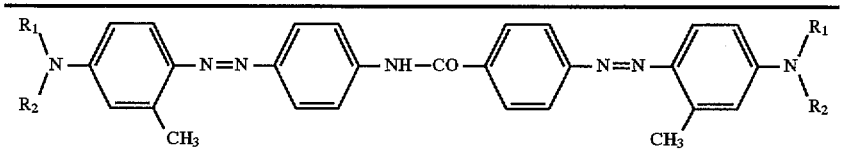

| Examples | $R_1$ | $R_2$ |
|---|---|---|
| 2 | $C_2H_5$ | $C_2H_4-\overset{\oplus}{\underset{CH_3}{N}}-(C_2H_4OH)_2$ |
| 3 | $C_2H_5$ | $C_2H_4-\overset{\oplus}{N}-(C_2H_4OH)_3$ |
| 4 | $C_2H_5$ | $C_2H_4-\overset{CH_3}{\underset{CH_3}{\overset{\oplus}{N}}}-CH_2-\overset{CH_3}{\underset{}{CH}}-OH$ |
| 5 | $C_2H_5$ | $C_2H_4-\overset{\oplus}{\underset{CH_3}{N}}-(CH_2-\overset{CH_3}{\underset{}{CH}}-OH)_2$ |
| 6 | $C_2H_5$ | $C_2H_4-\overset{\oplus}{N}-(CH_2-\overset{CH_3}{\underset{}{CH}}-OH)_3$ |
| 7 | $C_2H_5$ | $C_2H_4-\overset{\oplus}{N}-(CH_3)_3$ |
| 8 | $C_2H_5$ | $C_2H_4-\overset{\oplus}{N}-(C_2H_5)_3$ |
| 9 | $C_2H_5$ | $C_2H_4-\overset{\oplus}{N}-(C_4H_9)_3$ |
| 10 | $C_2H_5$ | $C_2H_4-\overset{\oplus}{\underset{C_2H_5}{N}}-(CH_3)_2$ |
| 11 | $C_2H_5$ | $C_2H_4-\overset{\oplus}{\underset{CH_3}{N}}-(C_2H_5)_2$ |
| 12 | $C_2H_5$ | $C_2H_4-\overset{CH_3}{\underset{C_2H_5}{\overset{\oplus}{N}}}-C_2H_4-OH$ |
| 13 | $C_2H_5$ | $C_2H_4-\overset{CH_3}{\underset{C_2H_5}{\overset{\oplus}{N}}}-\overset{CH_3}{\underset{CH_2-OH}{CH}}$ |
| 14 | $C_2H_5$ | $CH_2-\underset{CH_3}{CH}-\overset{\oplus}{N}-(CH_3)_3$ |
| 15 | $C_2H_5$ | $CH_2-\underset{CH_3}{CH}-\overset{\oplus}{N}-(C_2H_4-OH)_3$ |
| 16 | $C_2H_5$ | $CH_2-\underset{CH_3}{CH}-\overset{\oplus}{N}\langle\text{pyridine}\rangle$ |
| 17 | $C_2H_5$ | $C_2H_4-\overset{CH_3}{\underset{CH_3}{\overset{\oplus}{N}}}-CH_2-C_6H_5$ |

-continued
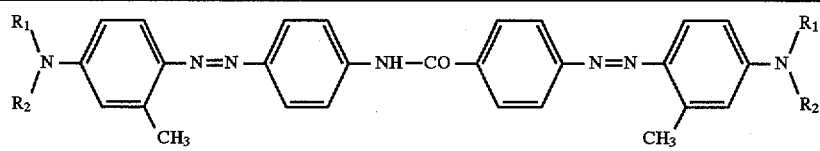
| Examples | R₁ | R₂ |
|---|---|---|
| 18 | C₂H₅ | 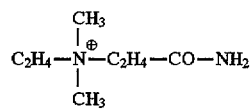 |
| 19 | C₂H₅ | 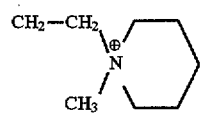 |
| 20 | C₂H₅ | 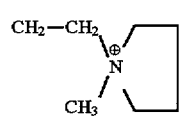 |
| 21 | C₂H₅ | 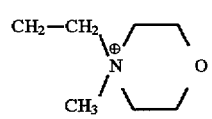 |
| 22 | C₂H₅ | 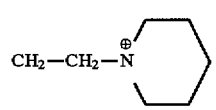 |
| 23 | C₂H₅ | 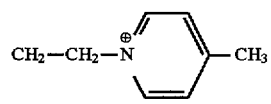 |
| 24 | C₂H₅ | 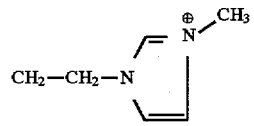 |
| 25 | C₂H₅ | 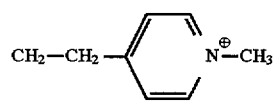 |
| 26 | C₂H₅ | 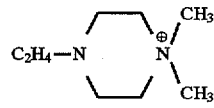 |
| 27 | C₂H₅ | 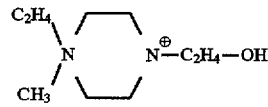 |
| 28 | C₂H₅ | 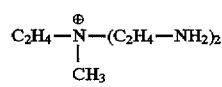 |
| 29 | C₂H₅ | 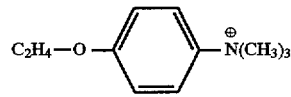 |

-continued

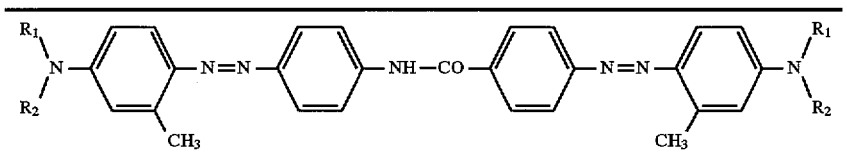

| Examples | R₁ | R₂ |
|---|---|---|
| 30 | $C_2H_5$ | $C_2H_4-O-CO-$ [N-methylpyridinium-3-yl] |
| 31 | | $R_1 + R_2 =$ piperidino |
| 32 | $C_2H_5$ | $C_2H_4-NH-CO-CH_2-$ [pyridinium] |
| 33 | $C_2H_5$ | $CH_2-CH(OH)-CH_2-\overset{\oplus}{N}(CH_3)_3$ |
| 34 | $C_2H_5$ | $CH_2-CH(OH)-CH_2-NH-CO-CH_2-$ [pyridinium] |
| 35 | $C_2H_5$ | $C_2H_4-N-(C_2H_4OH)_2$ |
| 36 | $C_2H_5$ | $C_2H_4-N(CH_3)-C_2H_4-OH$ |
| 37 | $C_2H_5$ | $C_2H_4-N-(CH_3)_2$ |
| 38 | $C_2H_5$ | $C_2H_4-N-(C_2H_5)_2$ |
| 39 | $C_2H_5$ | $C_2H_4-NH-C_2H_4-N-(CH_3)_2$ |
| 40 | $C_2H_5$ | $C_2H_4-NH-C_2H_4-N-(C_2H_5)_2$ |
| 41 | $C_2H_5$ | $C_2H_4-NH-C_3H_6-N-(CH_3)_2$ |
| 42 | $C_2H_5$ | $C_2H_4-NH-CH_2-CH(CH_3)-NH_2$ |
| 43 | $C_2H_5$ | $C_2H_4-N$(piperazino)$N-CH_3$ |
| 44 | $C_2H_5$ | $C_2H_4-N-(C_2H_4-NH_2)_2$ |
| 45 | | $R_1 + R_2 =$ 4-methylpiperazino |
| 46 | $C_2H_4-\overset{\oplus}{N}(CH_3)_2-CH_2-CH_2-OH$ | $C_2H_4-\overset{\oplus}{N}(CH_3)_2-CH_2-CH_2-OH$ |

-continued

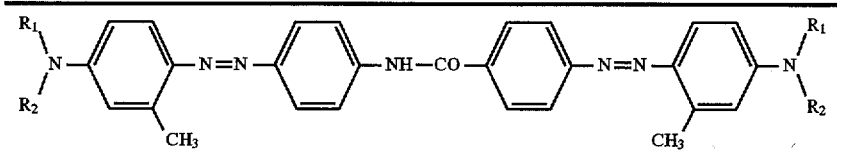

| Examples | R₁ | R₂ |
|---|---|---|
| 47 | $C_2H_4-\overset{\oplus}{\underset{CH_3}{N}}-(C_2H_4-OH)_2$ | $C_2H_4-\overset{\oplus}{\underset{CH_3}{N}}-(C_2H_4-OH)_2$ |
| 48 | $C_2H_4-\overset{\oplus}{N}-(C_2H_4-OH)_3$ | $C_2H_4-\overset{\oplus}{N}-(C_2H_4-OH)_3$ |
| 49 | $CH_2-CH_2-\overset{\oplus}{N}\langle\text{pyridinium}\rangle$ | $CH_2-CH_2-\overset{\oplus}{N}\langle\text{pyridinium}\rangle$ |
| 50 | $C_2H_4-\overset{\oplus}{N}-(CH_3)_3$ | $C_2H_4-\overset{\oplus}{N}-(CH_3)_3$ |
| 51 | $C_2H_4-\overset{\oplus}{N}-(C_2H_5)_3$ | $C_2H_4-\overset{\oplus}{N}-(C_2H_5)_3$ |
| 52 | $C_2H_4-N-(CH_3)_2$ | $C_2H_4-N-(CH_3)_2$ |
| 53 | $C_2H_4-N-(C_2H_4OH)_2$ | $C_2H_4-N-(C_2H_4OH)_2$ |
| 54 | $C_2H_4-\underset{CH_3}{N}-C_2H_4-OH$ | $C_2H_4-\underset{CH_3}{N}-C_2H_4-OH$ |
| 55 | $C_2H_4-NH-C_2H_4-N-(C_2H_5)_2$ | $C_2H_4-NH-C_2H_4-N-(C_2H_5)_2$ |
| 56 | $CH_3$ | $C_2H_4-\overset{CH_3}{\underset{CH_3}{\overset{\mid}{\underset{\mid}{N^\oplus}}}}-CH_2-CH_2-OH$ |
| 57 | $CH_3$ | $C_2H_4-\overset{\oplus}{N}-(C_2H_4-OH)_3$ |
| 58 | $CH_3$ | $CH_2-CH_2-\overset{\oplus}{N}\langle\text{pyridinium}\rangle$ |
| 59 | $CH_3$ | $C_2H_4-\overset{\oplus}{N}-(CH_3)_3$ |
| 60 | $C_3H_7$ | $C_2H_4-\overset{CH_3}{\underset{CH_3}{\overset{\mid}{\underset{\mid}{N^\oplus}}}}-CH_2-CH_2-OH$ |
| 61 | $C_3H_7$ | $C_2H_4-\overset{\oplus}{N}-(C_2H_4-OH)_3$ |
| 62 | $C_3H_7$ | $CH_2-CH_2-\overset{\oplus}{N}\langle\text{pyridinium}\rangle$ |
| 63 | $C_3H_7$ | $C_2H_4-\overset{\oplus}{N}-(CH_3)_3$ |
| 64 | $CH_2-\text{Ph}$ | $C_2H_4-\overset{\oplus}{N}-(C_2H_4-OH)_3$ |
| 65 | $CH_2-\text{Ph}$ | $CH_2-CH_2-\overset{\oplus}{N}\langle\text{pyridinium}\rangle$ |
| 66 | $CH_2-CH_2-CN$ | $C_2H_4-\overset{\oplus}{N}-(C_2H_4-OH)_3$ |

-continued

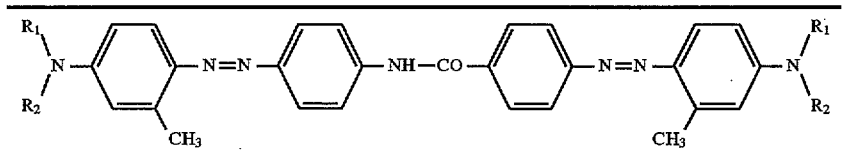

| Examples | R₁ | R₂ |
|---|---|---|
| 67 | $CH_2-CH_2-CN$ | 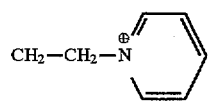 |
| 68 | $CH_2-CH_2-Cl$ | 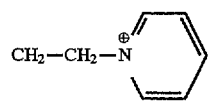 |
| 69 | $CH_2-CH_2-CO-O-CH_3$ | 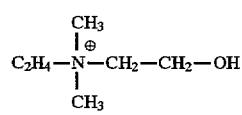 |
| 70 | H | 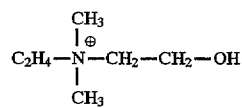 |
| 71 | H | 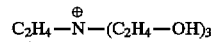 |
| 72 | H | 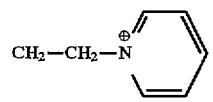 |
| 73 | H | 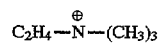 |
| 74 | $CH_2-CH_2-O-CO-CH_3$ | 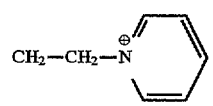 |

EXAMPLES 75–91

The following dyes are prepared in general accordance with the procedure described in Example 1. They dye paper in yellowish to reddish orange or brown shades having good fastness properties.

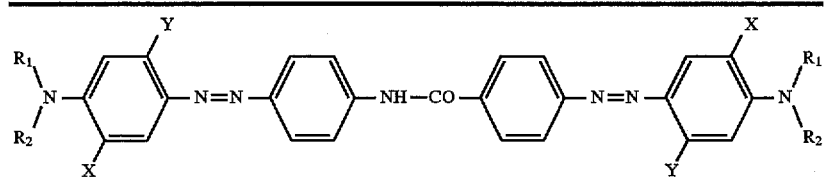

| Ex. | R₁ | R₂ | Y | X |
|---|---|---|---|---|
| 75 | $C_2H_5$ | $C_2H_4-\overset{\oplus}{N}-(CH_3)_3$ | H | H |
| 76 | $C_2H_5$ | $C_2H_4-\overset{\oplus}{N}-(C_2H_4OH)_3$ | H | H |
| 77 | $C_2H_5$ | $C_2H_4-\underset{CH_3}{\overset{CH_3}{\overset{|}{\underset{|}{N}}}}-C_2H_4-OH$ | H | H |

-continued

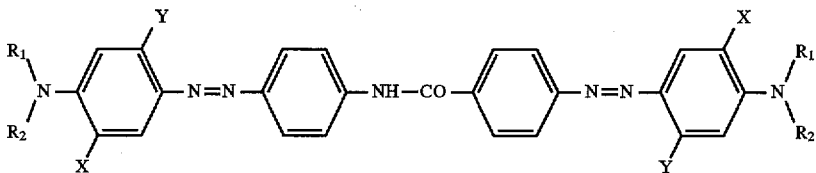

| Ex. | R₁ | R₂ | Y | X |
|---|---|---|---|---|
| 78 | C₂H₅ | CH₂—CH₂—N⁺(pyridinium) | H | H |
| 79 | CH₃ | C₂H₄—N⁺—(C₂H₄OH)₃ | H | H |
| 80 | C₂H₅ | C₂H₄—N—(C₂H₄—NH₂)₂ | H | H |
| 81 | C₂H₅ | CH₂—CH₂—N⁺(pyridinium) | OCH₃ | H |
| 82 | C₂H₅ | C₂H₄—N⁺—(C₂H₄OH)₃ | OCH₃ | H |
| 83 | C₂H₅ | C₂H₄—N⁺(CH₃)(CH₃)—C₂H₄—OH | OCH₃ | H |
| 84 | C₂H₅ | CH₂—CH₂—N⁺(pyridinium) | OCH₃ | OCH₃ |
| 85 | C₂H₅ | C₂H₄—N⁺—(CH₃)₃ | CH₃ | CH₃ |
| 86 | C₂H₅ | CH₂—CH₂—N⁺(pyridinium) | NH—CO—CH₃ | H |
| 87 | C₂H₅ | C₂H₄—N⁺—(C₂H₄OH)₃ | NH—CO—CH₃ | H |
| 88 | C₂H₅ | C₂H₄—N⁺(CH₃)—(C₂H₄—OH)₂ | NH—CO—CH₃ | H |
| 89 | C₂H₅ | CH₂—CH₂—N⁺(pyridinium) | NH—CO—CH₃ | OCH₃ |
| 90 | C₂H₅ | C₂H₄—N⁺—(C₂H₄OH)₃ | NH—CO—CH₃ | OCH₃ |
| 91 | C₂H₅ | CH₂—CH₂—N⁺(pyridinium) | Cl | H |

EXAMPLES 92–118

The following dyes are prepared in general accordance with the procedure described in Example 1. They dye paper in yellowish to reddish orange shades of good fastness properties.

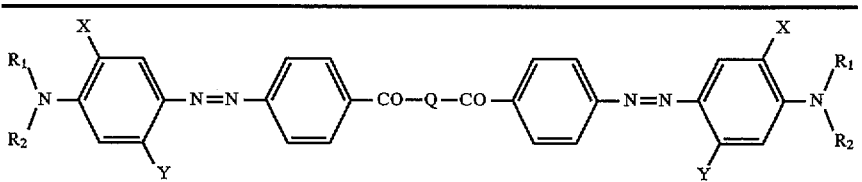

| Ex. | R₁ | R₂ | Y | X | Q |
|---|---|---|---|---|---|
| 92 | $C_2H_5$ | $CH_2-CH_2-N^{\oplus}(C_5H_5)$ (pyridinium) | $CH_3$ | H | $NH-CH_2-CH_2-NH$ |
| 93 | $C_2H_5$ | $C_2H_4-\overset{\oplus}{N}(CH_3)-(C_2H_4-OH)_2$ | $CH_3$ | H | $NH-CH_2-CH_2-NH$ |
| 94 | $C_2H_5$ | $C_2H_4-\overset{\oplus}{N}(CH_3)_2-C_2H_4-OH$ | $CH_3$ | H | $NH-CH_2-CH_2-NH$ |
| 95 | $C_2H_5$ | $CH_2-CH_2-N^{\oplus}(C_5H_5)$ | $CH_3$ | H | $NH-(CH_2)_4-NH$ |
| 96 | $C_2H_5$ | $C_2H_4-\overset{\oplus}{N}(CH_3)-(C_2H_4-OH)_2$ | $CH_3$ | H | $NH-(CH_2)_4-NH$ |
| 97 | $C_2H_5$ | $C_2H_4-\overset{\oplus}{N}(CH_3)_2-C_2H_4-OH$ | $CH_3$ | H | $NH-(CH_2)_4-NH$ |
| 98 | $C_2H_5$ | $CH_2-CH_2-N^{\oplus}(C_5H_5)$ | $CH_3$ | H | $NH-CH_2-CH(CH_3)-NH$ |
| 99 | $C_2H_5$ | $C_2H_4-\overset{\oplus}{N}(CH_3)-(C_2H_4-OH)_2$ | $CH_3$ | H | $NH-CH_2-CH(CH_3)-NH$ |
| 100 | $C_2H_5$ | $C_2H_4-\overset{\oplus}{N}(CH_3)_2-C_2H_4-OH$ | $CH_3$ | H | $NH-CH_2-CH(CH_3)-NH$ |
| 101 | $C_2H_5$ | $CH_2-CH_2-N^{\oplus}(C_5H_5)$ | $CH_3$ | H | piperazine (N—N) |
| 102 | $C_2H_5$ | $C_2H_4-\overset{\oplus}{N}(CH_3)-(C_2H_4-OH)_2$ | $CH_3$ | H | piperazine (N—N) |
| 103 | $C_2H_5$ | $C_2H_4-\overset{\oplus}{N}(CH_3)_2-C_2H_4-OH$ | $CH_3$ | H | piperazine (N—N) |
| 104 | $C_2H_5$ | $CH_2-CH_2-N^{\oplus}(C_5H_5)$ | $CH_3$ | H | $NH-C_6H_4-NH$ |

-continued

[Structure: R1R2N-C6H2(X)(Y)-N=N-C6H4-CO-Q-CO-C6H4-N=N-C6H2(X)(Y)-NR1R2]

| Ex. | R₁ | R₂ | Y | X | Q |
|---|---|---|---|---|---|
| 105 | $C_2H_5$ | $C_2H_4-\overset{\oplus}{N}(CH_3)-(C_2H_4-OH)_2$ | $CH_3$ | H | NH–C₆H₄–NH (para) |
| 106 | $C_2H_5$ | $C_2H_4-\overset{\oplus}{N}(CH_3)_2-C_2H_4-OH$ | $CH_3$ | H | NH–C₆H₄–NH (para) |
| 107 | $C_2H_5$ | $CH_2-CH_2-\overset{\oplus}{N}(pyridinium)$ | $CH_3$ | H | $N-CH_2-CH_2-OH$ |
| 108 | $C_2H_5$ | $C_2H_4-\overset{\oplus}{N}(CH_3)-(C_2H_4-OH)_2$ | $CH_3$ | H | $N-CH_2-CH_2-OH$ |
| 109 | $C_2H_5$ | $C_2H_4-\overset{\oplus}{N}(CH_3)_2-C_2H_4-OH$ | $CH_3$ | H | $N-CH_2-CH_2-OH$ |
| 110 | $CH_3$ | $CH_2-CH_2-\overset{\oplus}{N}(pyridinium)$ | $CH_3$ | H | $NH-CH_2-CH_2-NH$ |
| 111 | $CH_3$ | $CH_2-CH_2-\overset{\oplus}{N}(pyridinium)$ | H | H | $NH-CH_2-CH_2-NH$ |
| 112 | $C_2H_5$ | $C_2H_4-\overset{\oplus}{N}(CH_3)-(C_2H_4-OH)_2$ | $OCH_3$ | $OCH_3$ | $NH-(CH_2)_4-NH$ |
| 113 | $C_2H_5$ | $C_2H_4-\overset{\oplus}{N}(CH_3)_2-C_2H_4-OH$ | $CH_3$ | $CH_3$ | $NH-CH(CH_3)-CN-NH$ |
| 114 | $C_2H_5$ | $CH_2-CH_2-\overset{\oplus}{N}(pyridinium)$ | $OCH_3$ | H | $NH-CH_2-CH_2-NH$ |
| 115 | $C_2H_5$ | $CH_2-CH_2-\overset{\oplus}{N}(pyridinium)$ | $NHCOCH_3$ | H | piperazine (N–N) |
| 116 | $C_2H_5$ | $CH_2-CH_2-\overset{\oplus}{N}(pyridinium)$ | $CH_3$ | H | NH–C₆H₄–NH (para) |
| 117 | $C_2H_5$ | $CH_2-CH_2-\overset{\oplus}{N}(pyridinium)$ | Cl | Cl | $HN-C_3H_6-O-CH_2$ / $HN-C_3H_6-O-CH_2$ |

-continued

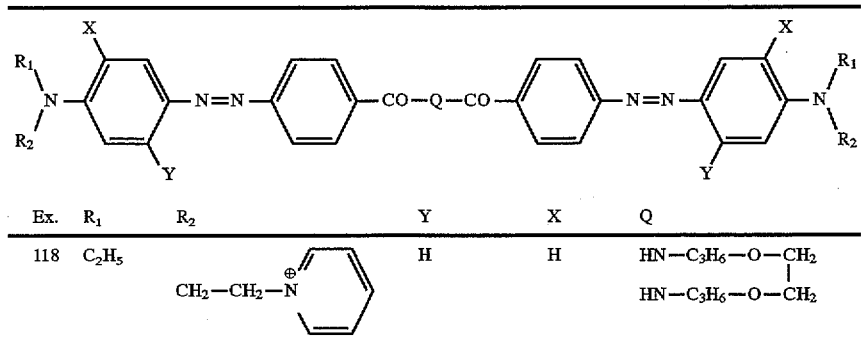

| Ex. | R₁ | R₂ | Y | X | Q |
|---|---|---|---|---|---|
| 118 | C₂H₅ | CH₂—CH₂—N⊕(pyridinium) | H | H | HN—C₃H₆—O—CH₂ / HN—C₃H₆—O—CH₂ |

EXAMPLE 119

22.7 parts of 4,4'-diaminobenzanilide are tetrazotised by known method in 500 parts of water and 50 parts of 32% hydrochloric acid with sodium nitrite in the temperature range from 0° to 5° C. Then 15.6 parts of N-ethyl-N-(N'-dimethyl-N'-hydroxyethylammonium)ethyl-1,3-toluidine chloride and 5 parts of sodium acetate are added. Coupling is carried out at pH 2 to 3, which is kept constant by the addition of 4N sodium hydroxide solution, and in the temperature range from 0° to 5° C. When the coupling is complete, 14 parts of 3-methyl-5-pyrazolone-1-carboxamidine, dissolved in 700 parts of water and 160 parts of acetic acid, are added to the orange suspension. The pH is adjusted to 4.0 by addition of 4N sodium hydroxide solution, the temperature is raised to 30° C. and the coupling is completed. The pH is then adjusted to 10, the suspension is filtered and the residue is dried, to give 81 parts of the dye of formula

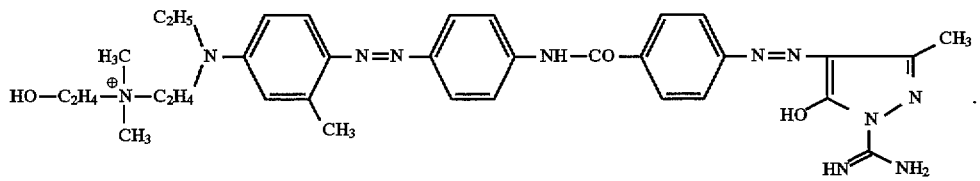

The dye dyes paper in a reddish yellow shade of good wetfastness and lightfastness properties. The waste-waters are colourless.

EXAMPLE 120

The general procedure of Example 119 is repeated, but first adding to the tetrazo solution 14 parts of 3-methyl-5-pyrazolone-1-carboxamidine under analogous conditions and coupling, then adding 15.6 parts of N-ethyl-N-(N'-dimethyl-N'-hydroxy-ethylammonium)ethyl-1,3-toluidine chloride and coupling in analogous manner, to give the dye of formula

| Ex. | Q | R | Y | K |
|---|---|---|---|---|
| 121 | CO—NH | pyridinium | H | 3-methyl-5-hydroxy-1-guanidino-pyrazole |
| 122 | CONH—(CH₂)₂—NHCO | N⁺(CH₃)(C₂H₄—OH)₂ | CH₃ | 3-methyl-5-hydroxy-1-guanidino-pyrazole |
| 123 | CO—NH | pyridinium | H | 3-methyl-N-ethyl-N-(2-pyridinium-ethyl)aniline |
| 124 | CO—NH | pyridinium | Cl | 3-methyl-N-ethyl-N-(2-pyridinium-ethyl)aniline |
| 125 | CO—NH | N⁺(CH₃)₂—C₂H₄—OH | CH₃ | 3-methyl-5-hydroxy-pyrazole |
| 126 | CO—NH | pyridinium | H | 3-methyl-5-hydroxy-pyrazole |
| 127 | CO—NH | pyridinium | CH₃ | 3-methyl-5-hydroxy-pyrazole |
| 128 | NH—CO | pyridinium | CH₃ | 3-methyl-5-hydroxy-pyrazole |
| 129 | CO—NH | pyridinium | H | barbituric acid derivative |

-continued
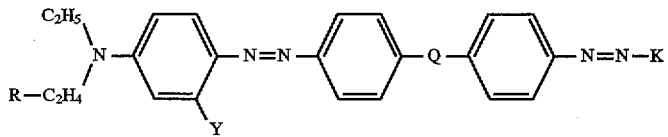
| Ex. | Q | R | Y | K |
|---|---|---|---|---|
| 130 | NH—CO |  | CH$_3$ | 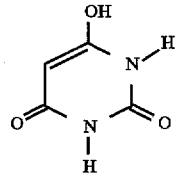 |
| 131 | CONH—(CH$_2$)$_2$—NHCO | 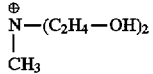 | CH$_3$ | 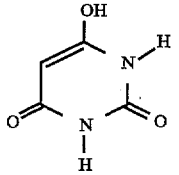 |
| 132 | CO—NH |  | H | 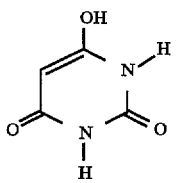 |
| 133 | CO—NH |  | CH$_3$ | 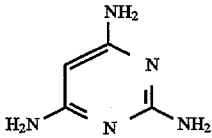 |
| 134 | CO—NH |  | H | 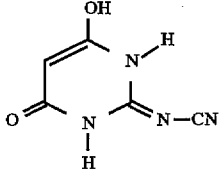 |
| 135 | NH—CO |  | CH$_3$ | 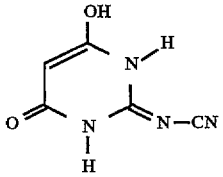 |
| 136 | CO—NH |  | CH$_3$ | 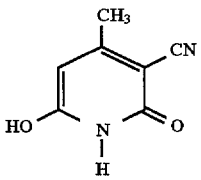 |
| 137 | NH—CO |  | CH$_3$ | 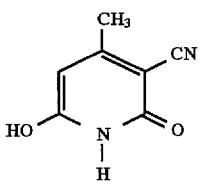 |

-continued
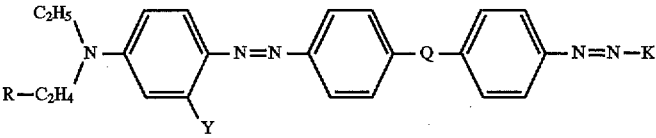
| Ex. | Q | R | Y | K |
|---|---|---|---|---|
| 138 | 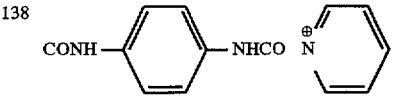 |  | CH₃ | 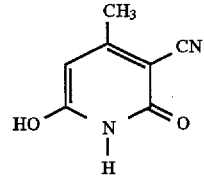 |
| 139 | CO—NH |  | H | 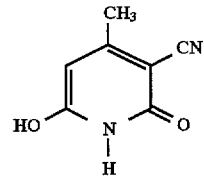 |
| 140 | CO—NH |  | H | 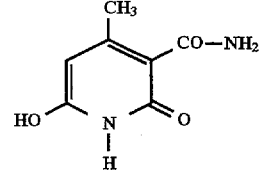 |
| 141 | CO—NH | 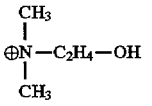 | CH₃ | 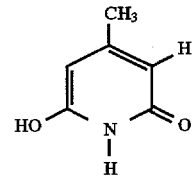 |
| 142 | CO—NH | 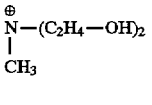 | CH₃ | 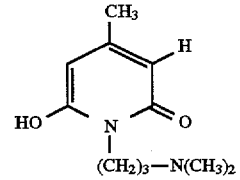 |
| 143 | NH—CO | 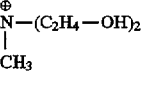 | CH₃ | 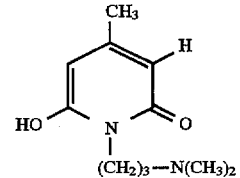 |
| 144 | CO—NH |  | H | 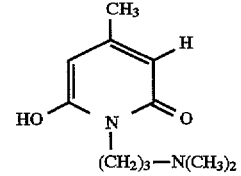 |

-continued
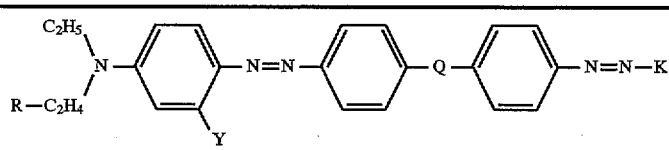
| Ex. | Q | R | Y | K |
|---|---|---|---|---|
| 145 | CO—NH | 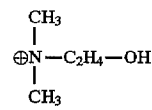 | CH₃ | 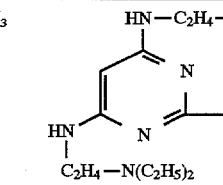 |
which dyes paper in a reddish yellow shade of good wet-fastness and lightfastness properties. The waste-waters are colourless.
EXAMPLES 121 to 145
The following dyes are prepared in general accordance with the procedure described in Examples 119 and 120. They dye paper in yellow to orange shades.
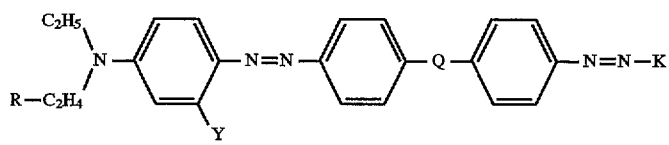
| Ex. | Q | R | Y | K |
|---|---|---|---|---|
| 121 | CO—NH | 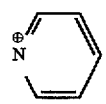 | H | 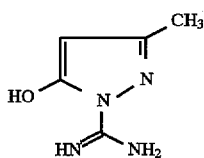 |
| 122 | CONH—(CH₂)₂—NHCO | 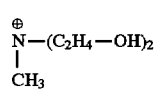 | CH₃ | 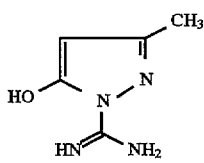 |
| 123 | CO—NH | 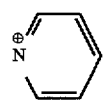 | H | 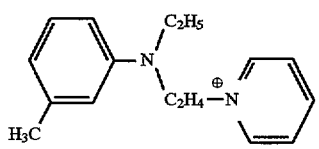 |
| 124 | CO—NH | 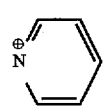 | Cl | 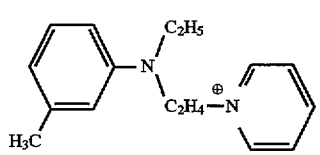 |

-continued

Structure: (C2H5)(R-C2H4)N-C6H3(Y)-N=N-C6H4-Q-C6H4-N=N-K

| Ex. | Q | R | Y | K |
|---|---|---|---|---|
| 125 | CO—NH | ⊕N(CH3)2(CH3)—C2H4—OH | CH3 | 3-methyl-5-hydroxy-pyrazole |
| 126 | CO—NH | pyridinium⊕ | H | 3-methyl-5-hydroxy-pyrazole |
| 127 | CO—NH | pyridinium⊕ | CH3 | 3-methyl-5-hydroxy-pyrazole |
| 128 | NH—CO | pyridinium⊕ | CH3 | 3-methyl-5-hydroxy-pyrazole |
| 129 | CO—NH | pyridinium⊕ | H | 6-hydroxy-barbituric acid |
| 130 | NH—CO | pyridinium⊕ | CH3 | 6-hydroxy-barbituric acid |
| 131 | CONH—(CH2)2—NHCO | ⊕N(CH3)(C2H4—OH)2 | CH3 | 6-hydroxy-barbituric acid |
| 132 | CO—NH | pyridinium⊕ | H | 6-hydroxy-barbituric acid |

-continued
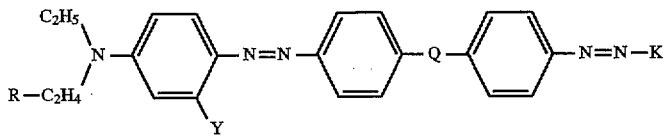
| Ex. | Q | R | Y | K |
|---|---|---|---|---|
| 133 | CO—NH |  | CH$_3$ | 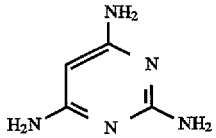 |
| 134 | CO—NH |  | H | 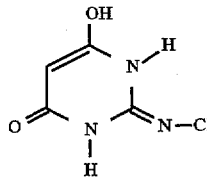 |
| 135 | NH—CO |  | CH$_3$ | 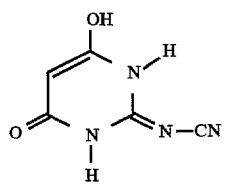 |
| 136 | CO—NH |  | CH$_3$ | 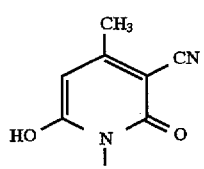 |
| 137 | NH—CO |  | CH$_3$ | 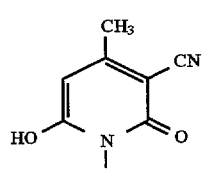 |
| 138 |  | | CH$_3$ | 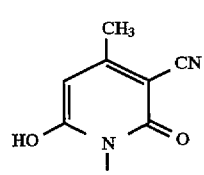 |
| 139 | CO—NH |  | H | 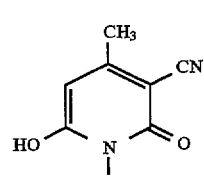 |
| 140 | CO—NH |  | H | 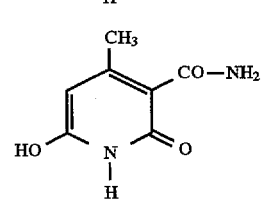 |

-continued
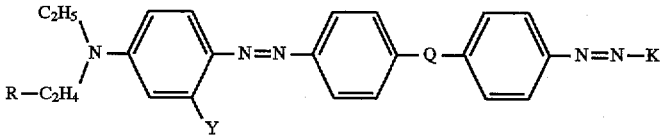
| Ex. | Q | R | Y | K |
|---|---|---|---|---|
| 141 | CO—NH | 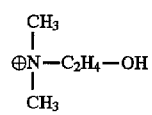 | CH₃ | 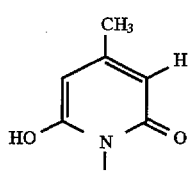 |
| 142 | CO—NH | 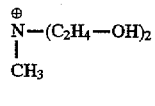 | CH₃ | 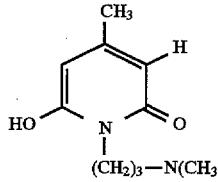 |
| 143 | NH—CO | 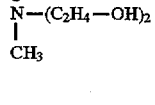 | CH₃ | 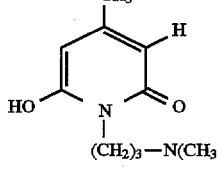 |
| 144 | CO—NH | 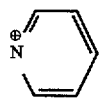 | H | 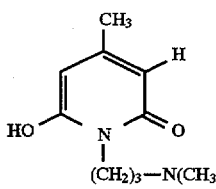 |
| 145 | CO—NH | 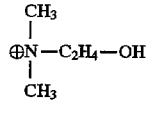 | CH₃ | 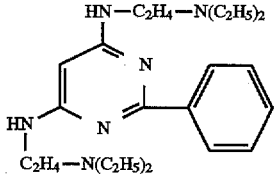 |
EXAMPLES 146 to 155
The following dyes are prepared in general accordance with the procedure described in Examples 119 and 120. They dye paper in yellow to orange shades.

| Ex. | Q | R | Y | K |
|---|---|---|---|---|
| 146 | CO—NH | pyridinium | CH₃ | 1-(pyridinium-methyl-carbonylamino)-3-methyl-pyrazole |
| 147 | CO—NH | pyridinium | CH₃ | 5-hydroxy-3-(CO—NH—(CH₂)₃—N(CH₃)₂)-pyrazole |
| 148 | NH—CO | pyridinium | CH₃ | 5-hydroxy-3-(CO—NH—(CH₂)₃—N(CH₃)₂)-pyrazole |
| 149 | NH—CO | (CH₃)₂N⁺—C₂H₄—OH | CH₃ | 5-hydroxy-3-methyl-1-[4-(NHCO-CH₂-pyridinium)phenyl]pyrazole |
| 150 | NH—CO | (CH₃)₂N⁺—C₂H₄—OH | CH₃ | 5-hydroxy-3-methyl-1-[4-(N⁺(CH₃)₃)phenyl]pyrazole |
| 151 | NH—CO | pyridinium | H | CO—CH₃ / CH₂—CO—NH—C₆H₄—NH—CO—CH₂-pyridinium |
| 152 | CO—NH | pyridinium | H | CO—CH₃ / CH₂—CO—NH—C₆H₄—NH—CO—CH₂-pyridinium |

-continued

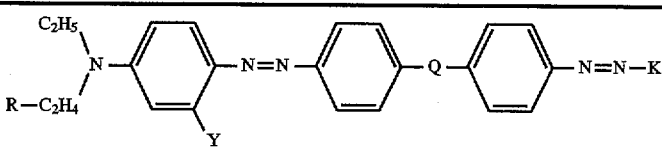

| Ex. | Q | R | Y | K |
|---|---|---|---|---|
| 153 | CO—NH | ⊕N-pyridyl | CH₃ | CO—CH₃ / CH₂—CO—NH—C₆H₄—NH—CO—CH₂—N⊕(pyridinium) |
| 154 | CO—NH | CH₃ / ⊕N—C₂H₄—OH / CH₃ | CH₃ | CO—CH₃ / CH₂—CO—NH—C₆H₄—CO—NH—(CH₂)₃—N(CH₃)₂ |
| 155 | CO—NH | CH₃ / ⊕N—C₂H₄—OH / CH₃ | CH₃ | CO—CH₂—N⊕(pyridinium) / CH—CO—NH—C₆H₄(OCH₃) |

EXAMPLE 156

24.5 parts of dehydrothiotoluidine are suspended in 400 parts of water and 25 parts of 32% hydrochloric acid and then diazotised by the dropwise addition of 6.9 parts of sodium nitrite at 0° to 5° C. Then 30.5 parts of N-ethyl-N'-pyridiniumethyl-1,3-toluidine chloride, dissolved in 100 parts of water, are added. Coupling is effected by addition of 30% sodium hydroxide solution at pH 2.0–2.5, while simultaneously raising the temperature over 2 hours from 5° C. to 30° C. during which process the dye crystallises out. The product is collected by suction filtration and dried, to give 50 parts of the dye of formula

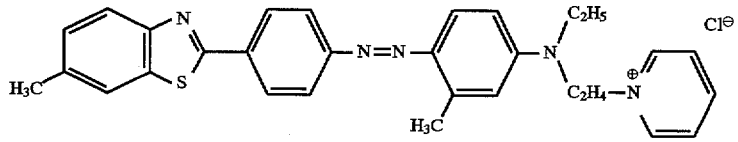

which dyes paper in a brilliant orange shade of excellent wetfastness and good lightfastness properties. The wastewaters are colourless.

EXAMPLES 157 bis 170

The following dyes are prepared in general accordance with the procedure described in Example 156. They dye paper in a yellowish to reddish orange shade, likewise having good fastness properties.

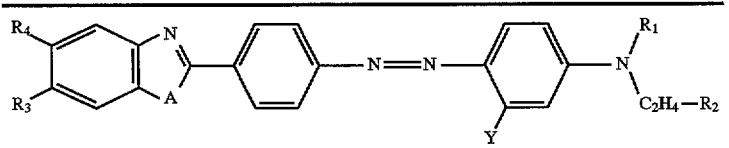

| Ex. | A | Y | $R_1$ | $R_2$ | $R_3$ | $R_4$ |
|---|---|---|---|---|---|---|
| 157 | S | $CH_3$ | $C_2H_5$ | $\overset{\underset{\mid}{CH_3}}{\overset{\oplus}{N}}-C_2H_4-OH$ with $CH_3$ | $CH_3$ | H |
| 158 | S | $CH_3$ | $C_2H_5$ | $\overset{\oplus}{N}-(C_2H_4-OH)_2$ with $CH_3$ | $CH_3$ | H |
| 159 | S | H | $C_2H_5$ | pyridinium | $CH_3$ | H |
| 160 | S | H | $C_2H_5$ | $\overset{\underset{\mid}{CH_3}}{\overset{\oplus}{N}}-C_2H_4-OH$ with $CH_3$ | $CH_3$ | H |
| 161 | S | H | $C_2H_5$ | $\overset{\oplus}{N}-(C_2H_4-OH)_2$ with $CH_3$ | $CH_3$ | H |
| 162 | S | $CH_3$ | $CH_3$ | pyridinium | $CH_3$ | H |
| 163 | S | $OCH_3$ | $CH_3$ | pyridinium | $CH_3$ | H |
| 164 | S | $NHCOCH_3$ | $CH_3$ | pyridinium | $CH_3$ | H |
| 165 | S | Cl | $CH_3$ | pyridinium | $CH_3$ | H |
| 166 | O | $CH_3$ | $C_2H_5$ | pyridinium | H | H |
| 167 | O | $CH_3$ | $C_2H_5$ | pyridinium | H | $CH_3$ |
| 168 | O | $CH_3$ | $C_2H_5$ | pyridinium | $CH_3$ | H |
| 169 | NH | $CH_3$ | $C_2H_5$ | pyridinium | H | H |

-continued

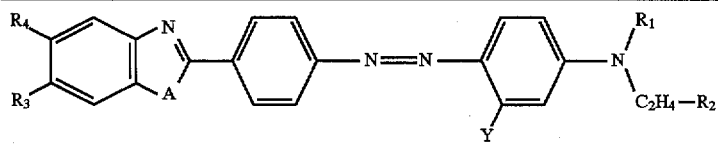

| Ex. | A | Y | $R_1$ | $R_2$ | $R_3$ | $R_4$ |
|-----|-----|-----|-------|-------|-------|-------|
| 170 | NH | $CH_3$ | $C_2H_5$ | pyridinium | $CH_3$ | H |

EXAMPLES 171 to 183

The following dyes are prepared in general accordance with the procedure described in Example 156. They dye paper in yellowish to reddish shades, likewise having good fastness properties.

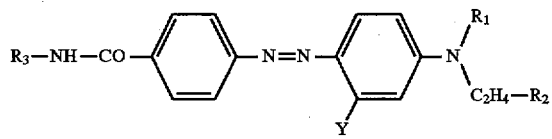

| Ex. | Y | $R_1$ | $R_2$ | $R_3$ |
|-----|-----|-------|-------|-------|
| 171 | $CH_3$ | $C_2H_5$ | pyridinium | 6-methylbenzothiazol-2-yl |
| 172 | $CH_3$ | $C_2H_5$ | pyridinium | 2,4-dimethylphenyl |
| 173 | $CH_3$ | $C_2H_5$ | pyridinium | 3,5-dimethylphenyl |
| 174 | $OCH_3$ | $C_2H_5$ | pyridinium | 3,5-dimethylphenyl |
| 175 | Cl | $C_2H_5$ | pyridinium | 3,5-dimethylphenyl |

-continued

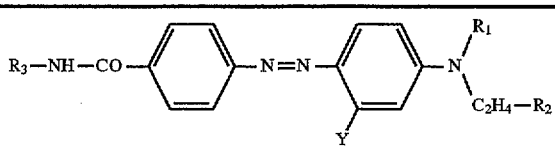

| Ex. | Y | $R_1$ | $R_2$ | $R_3$ |
|---|---|---|---|---|
| 176 | NHCOCH$_3$ | C$_2$H$_5$ | pyridinium | 3,5-dimethylphenyl |
| 177 | CH$_3$ | C$_2$H$_5$ | pyridinium | 4-chlorophenyl |
| 178 | CH$_3$ | C$_2$H$_5$ | pyridinium | 4-hydroxyphenyl |
| 179 | CH$_3$ | C$_2$H$_5$ | pyridinium | naphthyl |
| 180 | CH$_3$ | C$_2$H$_5$ | pyridinium | phenyl-N=N-phenyl- |
| 181 | CH$_3$ | C$_2$H$_5$ | pyridinium | phenyl-N=N-(3-methoxyphenyl)- |
| 182 | CH$_3$ | C$_2$H$_5$ | pyridinium | HOOC-phenyl-N=N-phenyl- |
| 183 | CH$_3$ | C$_2$H$_5$ | pyridinium | pyridyl-N=N-phenyl- |

EXAMPLE 184

The dye of formula

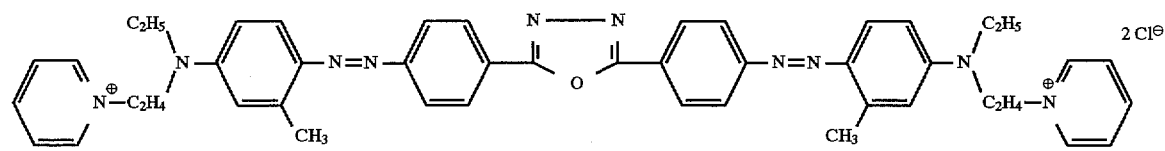

is also prepared in general accordance with the procedure described in Example 1. It dyes paper in an orange shade of good fastness properties.

EXAMPLES 185 to 196

The following dyes are prepared in general accordance with the procedure described in Example 1. They dye paper in yellowish to reddish orange or brown shades having good fastness properties.

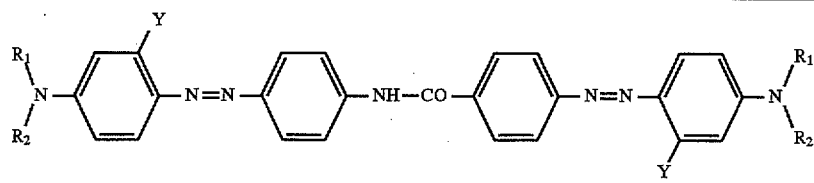

| Ex. | R₁ | R₂ | Y |
|---|---|---|---|
| 185 | CH₃ | C₂H₄—N⁺(CH₃)(CH₃)—CH₂—CH(CH₃)—OH | CH₃ |
| 186 | C₂H₅ | C₂H₄—N⁺(CH₃)(CH₃)—CH(CH₂OH)(CH₃) | CH₃ |
| 187 | C₂H₅ | C₂H₄—N⁺(CH₃)—[CH(CH₂OH)(CH₃)]₂ | CH₃ |
| 188 | H | C₂H₄—N⁺(CH₃)(CH₃)—CH₂—CH(CH₃)—OH | CH₃ |
| 189 | H | C₂H₄—N⁺(CH₃)—(CH₂—CH(CH₃)—OH)₂ | CH₃ |
| 190 | C₂H₅ | C₂H₄—N⁺(CH₃)(CH₃)—CH₂—CH(CH₃)—OH | H |
| 191 | CH₃ | C₂H₄—N⁺(CH₃)(CH₃)—CH₂—CH(CH₃)—OH | H |
| 192 | C₂H₅ | C₂H₄—N⁺(CH₃)—(CH₂—CH(CH₃)—OH)₂ | H |
| 193 | C₂H₅ | C₂H₄—N⁺(CH₃)(CH₃)—CH₂—CH(CH₃)—OH | OCH₃ |
| 194 | C₂H₅ | C₂H₄—N⁺(CH₃)—(CH₂—CH(CH₃)—OH)₂ | OCH₃ |
| 195 | H | C₂H₄—N⁺(CH₃)(CH₃)—CH₂—CH(CH₃)—OH | OCH₃ |

-continued

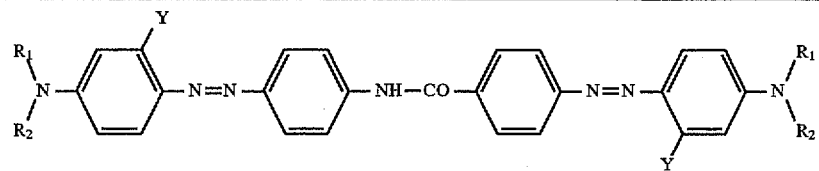

| Ex. | $R_1$ | $R_2$ | Y |
|---|---|---|---|
| 196 | $C_2H_5$ | $C_2H_4-\overset{\underset{\mid}{CH_3}}{\overset{\mid\oplus}{N}}-CH_2-\overset{\underset{}{CH_3}}{\overset{\mid}{CH}}-OH$ | $NH-CO-CH_3$ |
| 197 | $CH_3$ | $C_2H_4-\overset{\underset{\mid}{CH_3}}{\overset{\mid\oplus}{N}}-CH_2-\overset{\underset{}{CH_3}}{\overset{\mid}{CH}}-OH$ | $NH-CO-CH_3$ |

What is claimed is:

1. A process for dying paper which comprises treating the paper with a dye of formula

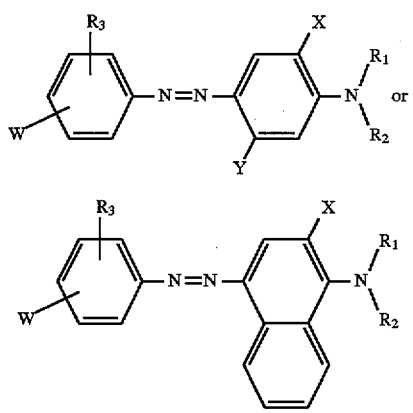

wherein

X and Y are each independently of the other hydrogen, halogen, $C_1-C_4$alkyl, $C_1-C_4$alkoxy, $C_1-C_4$alkylcarbonylamino, arylcarbonylamino, ureido or arylureido, $R_1$ is hydrogen, unsubstituted or substituted alkyl or aryl, or has the meaning of $R_2$, $R_2$ is a radical of formula

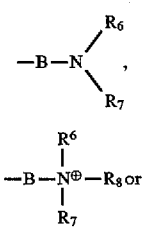

wherein B is an unbranched or branched alkylene radical, $R_6$ is hydrogen or unsubstituted or substituted alkyl, $R_7$ and $R_8$, are each independently of the other unsubstituted or substituted alkyl, and $Q^\oplus$ is a cyclic cationic radical, or wherein $R_6$ and $R_7$, together with the linking N atom, form an unsubstituted or substituted 5-, 6-, or 7-membered ring which may contain further hereto atoms, or wherein $R_6$, $R_7$ and $R_8$, taken together, form a pyridinium ring $R_3$ is a hydrogen, halogen, $C_1-C_4$alkyl or $C_1-C_4$alkoxy, W is a radical of formula

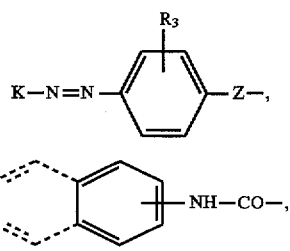

wherein

K is a coupling component,

Z is a linking group of formula $-NR_9-CO-$, $CO-NR_9-NR_9-CO-$,

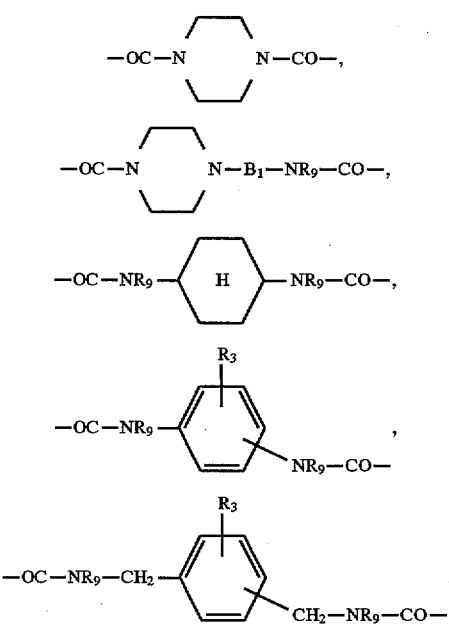

-continued

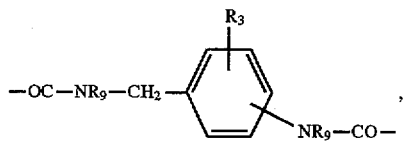

or —CO—NR₉—B₁—NR₉—CO—, wherein R₉ is hydrogen or unsubstituted or substituted C₁-C₄alkylene radical, in which the alkylene chain may be straight-chain or branched and may be interrupted by one or more than one member, selected from —NR₉—, —O— and —S—, and R₃ is hydrogen, halogen, C₁-C₄alkyl or C₁-C₄alkoxy, with the proviso that in the dyes having W as a radical of formula (3), R₂ is of formula (8) wherein Q⊕ is N-C₁-C₄alkylpiperidinium, N-C₁-C₄alkylmorpholinium, N-C₁-C₄alkylpyrrolidinium, N-C₁-C₄alkylpiperazinium, N-C₁-C₄alkyl-3-pyridinium or N-C₁-C₄alkyl-4-pyridinium.

2. A process according to claim 1, which comprises using a dye of formula (1) or (2), wherein X is hydrogen, methyl, methoxy or chloro.

3. A process according to claim 1, which comprises using a dye of formula (1), wherein Y is hydrogen, methyl, methoxy, acetylamino or chloro.

4. A process according to claim 1, which comprises using a dye of formula (1) or (2), wherein R₆, R₇ and R₈ are each independently of one another a C₁-C₄alkyl radical which is unsubstituted or substituted by hydroxy, amino, mono-C₁-C₄alkylamino, di-C₁-C₄alkylamino or phenyl, or wherein R₆ and R₇, together with the linking N atom, form a pyrrolidine, piperidine, morpholine or piperazine ring.

5. A process according to claim 1, which comprises using a dye of formula (1) or (2), wherein Q⊕ is N-C₁-C₄alkylpiperidinium, N-C₁-C₄alkylmorpholinium, N-C₁-C₄alkylpyrrolidinium, N-C₁-C₄alkylpiperazinium, N-C₁-C₄alkyl-3-pyridinium or N-C₁-C₄alkyl-4-pyridinium.

6. A process according to claim 1, which comprises using a dye of formula (1) or (2), wherein B is ethylene, n-propylene, isopropylene or n-butylene.

7. A process according to claim 1, which comprises using a dye of formula (1) or (2), wherein W is a radical of formula (3).

8. A process according to claim 1, which comprises using a dye of formula (1) or (2), wherein R₃ is hydrogen, chloro, methyl or methoxy.

9. A process according to claim 1, which comprises using a dye of formula (1) or (2), wherein R₉ is methyl or hydrogen, and R₃ is hydrogen.

10. A process according to claim 1, which comprises using a dye of formula (1) or (2), wherein B₁ is unsubstituted or hydroxy-substituted C₂-C₄alkylene, (C₂-C₆alkylene)-O-(C₂-C₆alkylene), (C₂-C₆alkylene)-O-(C₂-C₆alkylene)-O-(C₂-C₆alkylene) or (C₂-C₆alkylene)-NR₉-(C₂-C₆alkylene).

11. A process according to claim 1, which comprises using a dye of formula (1) or (2), wherein W is a radical of formula (3), wherein Z is a linking group of formula —NH—CO—, —CO—NH—NH—CO—,

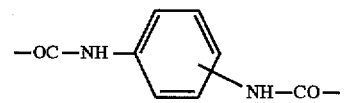

or —CO—NH—(C₂-C₄alkylene)—NH—CO—.

12. A process according to claim 1, which comprises using a dye of formula (1) or (2), wherein W is a radical of formula (3), wherein K is a coupling component of formula

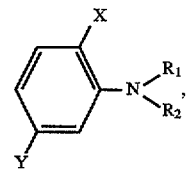

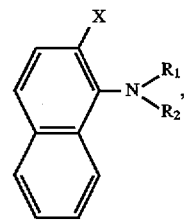

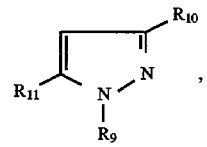

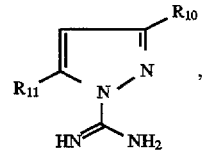

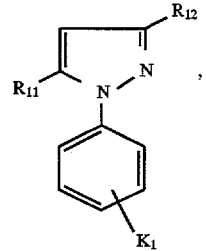

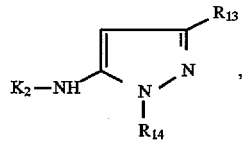

-continued

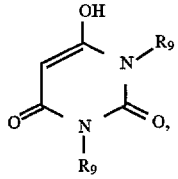

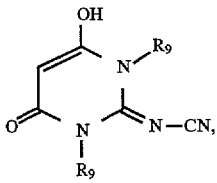

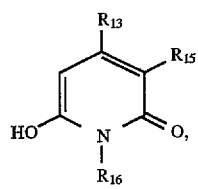

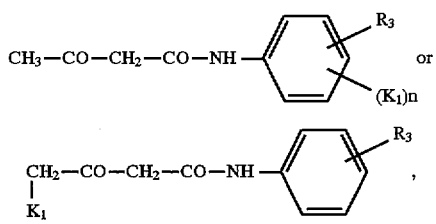

-continued

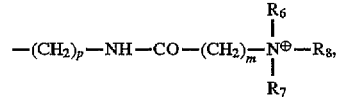

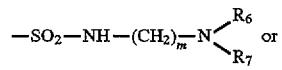

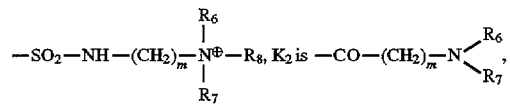

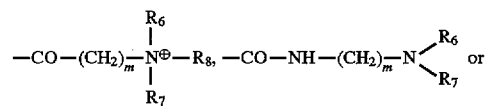

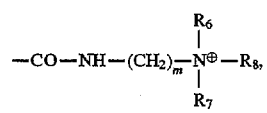

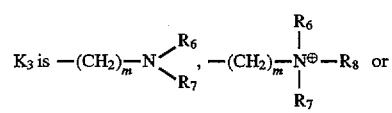

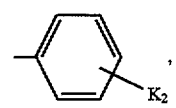

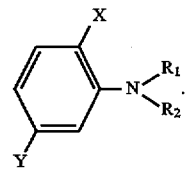

and m is 1 to 4, and $R_6$, $R_7$ and $R_8$ have the meanings given for formulae (6) and (7).

13. A process according to claim 12, which comprises using a dye of formula (1) or (2), wherein W is a radical of formula (3), wherein K is a coupling component of formula

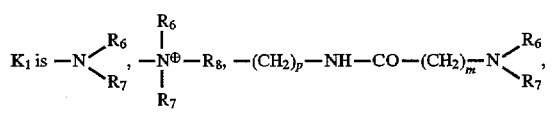

wherein X, Y, $R_1$ and $R_2$ have the meanings given for formulae (1) and (2), $R_{10}$ is $C_1$–$C_4$alkyl, carboxy or $K_2$, $R_{11}$ is hydroxy or amino, $R_9$ is hydrogen or unsubstituted or substituted $C_1$–$C_4$alkyl, $R_{12}$ is $C_1$–$C_4$alkyl or $K_2$, $R_{13}$ is $C_1$–$C_4$alkyl, $R_{14}$ is hydrogen, unsubstituted or substituted $C_1$–$C_4$alkyl or unsubstituted or substituted phenyl, $R_{15}$ is hydrogen, chloro, cyano or carbamoyl, $R_{16}$ is hydrogen, unsubstituted or substituted $C_1$–$C_4$alkyl or $K_3$, n is 1 or 2, 14. A process according to claim 1, which comprises using a dye of formulae

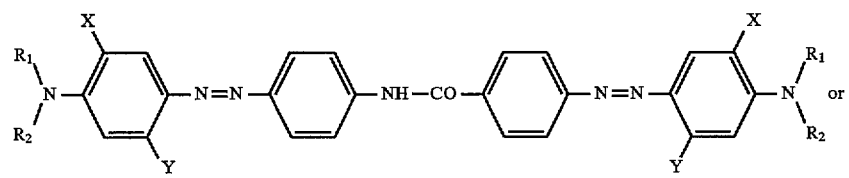

(9)

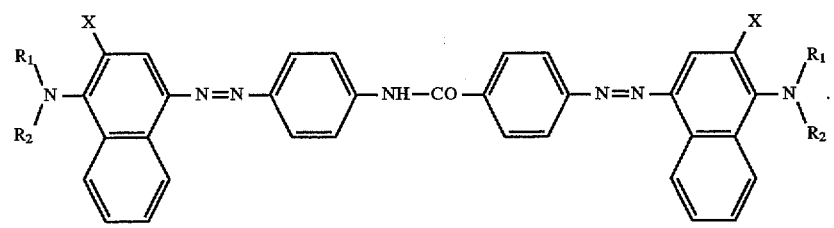

wherein
X and Y are each independently of the other hydrogen, halogen, $C_1$–$C_4$alkoxy, $C_1$–$C_4$alkylcarbonylamino, arylcarbonylamino, ureido or arylureido, $R_1$ is hydrogen, unsubstituted or substituted alkyl or aryl, or has the meaning of $R_2$, and $R_2$ is a radical of formula (8), wherein $Q^\oplus$ is N-$C_1$–$C_4$alkylpiperidinium, N-$C_1$–$C_4$alkylmorpholinium, N-$C_1$–$C_4$alkylpyrrolidinium, N-$C_1$–$C_4$alkylpiperazinium, N-$C_1$–$C_4$alkyl-3-pyridinium or N-$C_1$–$C_4$alkylpyridinium.

15. Paper obtained according to the process of claim 1.

16. A process according to claim 1, which comprises using a dye of formula (1) or (2), wherein $R_1$, is a $C_1$–$C_4$alkyl radical or a $C_1$–$C_4$alkyl radical which is substituted by chloro, cyano, phenyl, methoxycarbonyl, methoxycarbonyloxy, mono- or di-$C_1$–$C_4$alkylamino, the alkyl moieties of which mono- or di-$C_1$–$C_4$alkylamino groups may in turn be substituted by hydroxy, amino or mono- or di-$C_1$–$C_4$alkylamino, or wherein $R_1$ has one of the meanings cited in claim 1 for $R_2$.

\* \* \* \* \*

UNITED STATES PATENT AND TRADEMARK OFFICE
CERTIFICATE OF CORRECTION

PATENT NO. : 5,674,299
DATED : October 7, 1997
INVENTOR(S) : Adolf Kaser

It is certified that error appears in the above-identified patent and that said Letters Patent is hereby corrected as shown below:

Column 55, in the first line of claim 1: replace "dying" with -- dyeing --;

Column 55, claim 1, line 59, after formula (7): add -- or -B-$Q^{\ominus}$   (8) --;

Column 56, claim 1 between formulae (3) and (5): add -- or --;

Column 57, claim 1, line 10 should read: --gen or unsubstituted or substituted $C_1$-$C_4$alkyl, $B_1$ is a $C_2$-$C_{12}$alkylene radical, in --.

Signed and Sealed this

Nineteenth Day of May, 1998

Attest:

BRUCE LEHMAN

*Attesting Officer*          *Commissioner of Patents and Trademarks*